Jan. 29, 1952  G. P. LAY  2,583,656
HYDRAULIC AUTOMATIC SELECTIVE TRANSMISSION, INCLUDING TILT PLATES
Filed Feb. 1, 1950  5 Sheets-Sheet 1

Inventor
Giles P. Lay
By
Attorneys

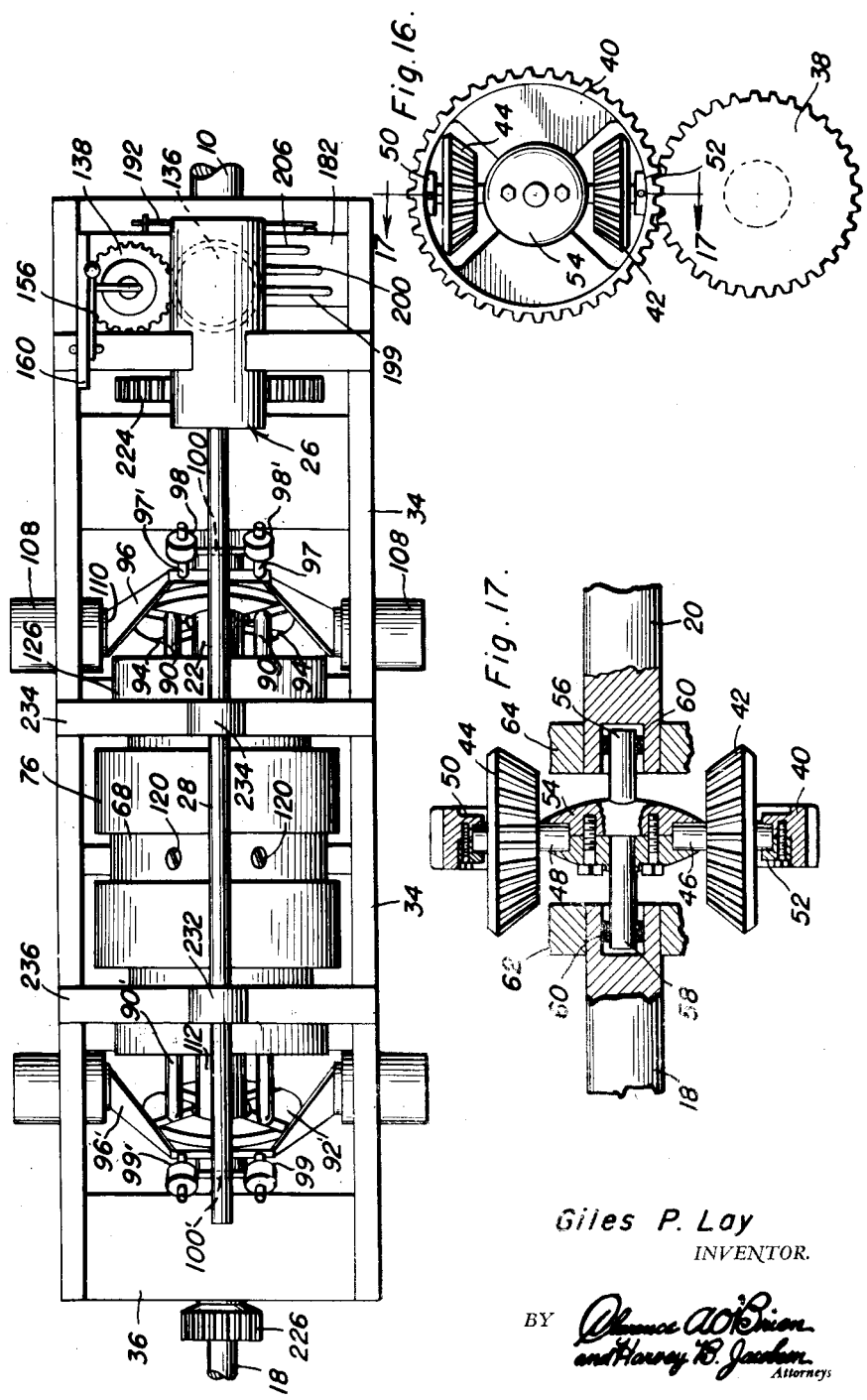

Jan. 29, 1952 G. P. LAY 2,583,656
HYDRAULIC AUTOMATIC SELECTIVE TRANSMISSION, INCLUDING TILT PLATES
Filed Feb. 1, 1950 5 Sheets-Sheet 3
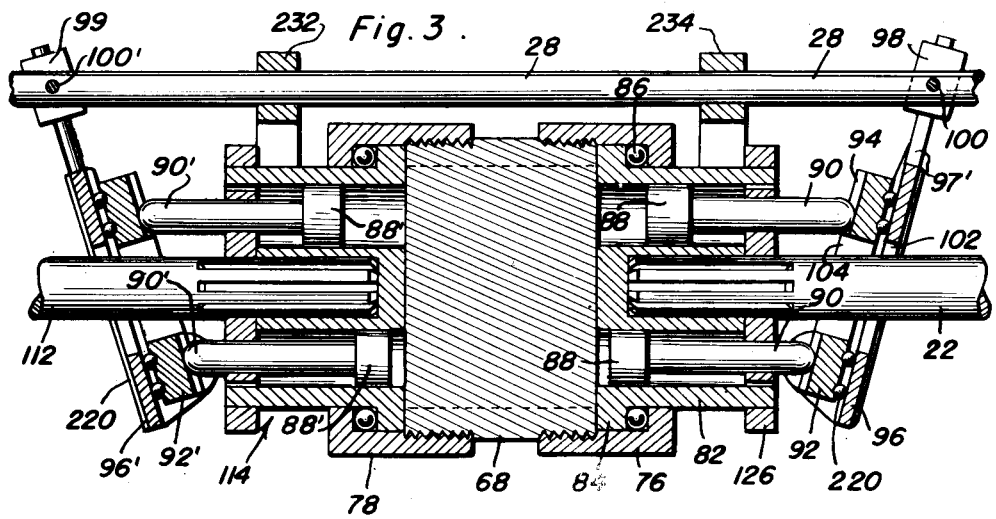
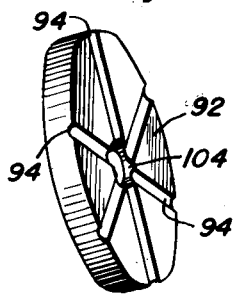
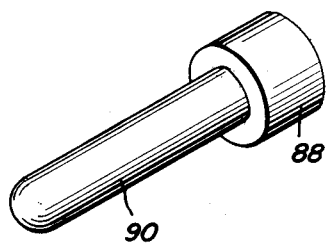
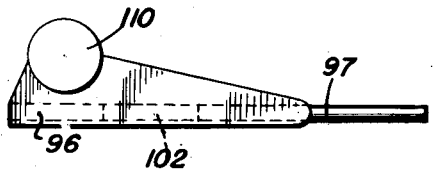
Giles P. Lay
INVENTOR.

Jan. 29, 1952     G. P. LAY     2,583,656
HYDRAULIC AUTOMATIC SELECTIVE TRANSMISSION, INCLUDING TILT PLATES
Filed Feb. 1, 1950     5 Sheets-Sheet 4

Inventor

Giles P. Lay

By    *Clarence A. O'Brien*
*and Harvey B. Jacobson*
Attorneys

Jan. 29, 1952  G. P. LAY  2,583,656
HYDRAULIC AUTOMATIC SELECTIVE TRANSMISSION, INCLUDING TILT PLATES
Filed Feb. 1, 1950  5 Sheets-Sheet 5
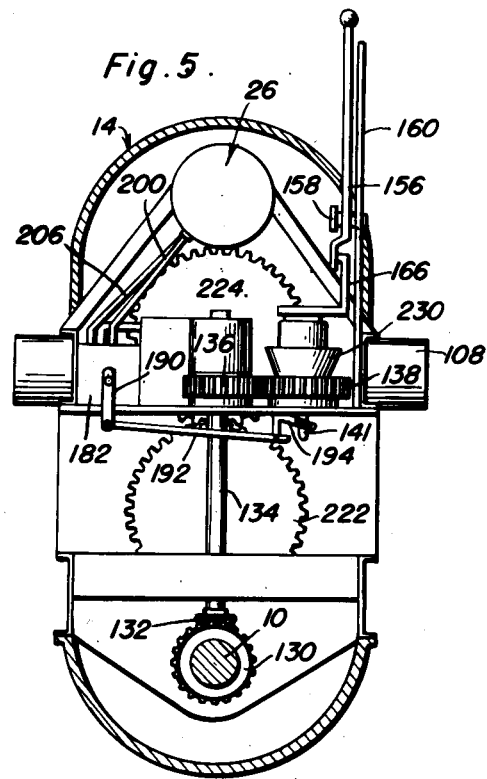
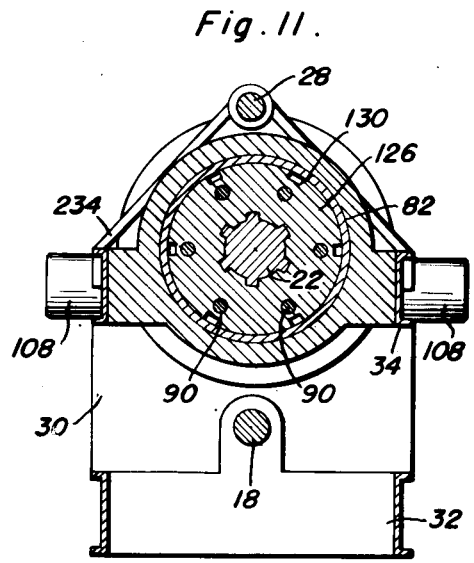
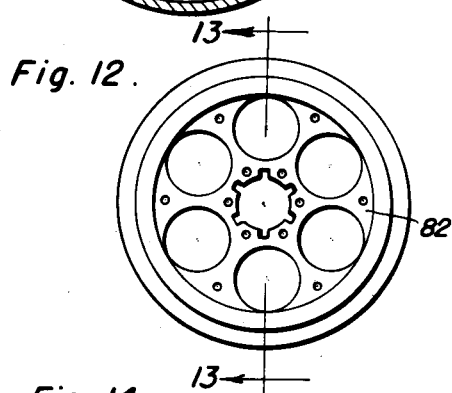
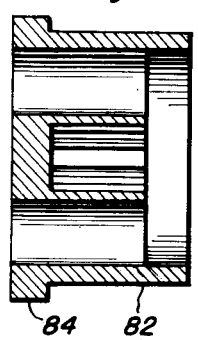
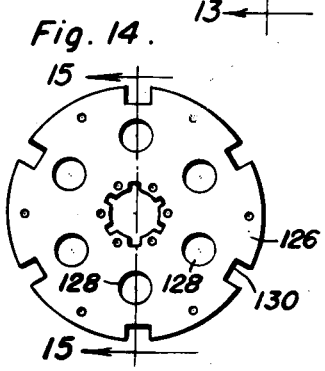
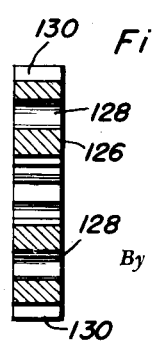
Inventor
Giles P. Lay
By *Clarence A. O'Brien and Harvey B. Jacobson*
Attorneys Patented Jan. 29, 1952

2,583,656

UNITED STATES PATENT OFFICE 2,583,656

HYDRAULIC AUTOMATIC SELECTIVE TRANSMISSION, INCLUDING TILT PLATES

Giles P. Lay, Ontario, Oreg., assignor to Lay Corporation, Portland, Oreg., a corporation of Oregon Application February 1, 1950, Serial No. 141,684

5 Claims. (Cl. 74—687)

This is a continuation-in-part of my copending application, Serial No. 25,173, which was filed on May 5, 1948, now abandoned.

An object of this invention is to selectively control the actuation of a power take-off or driven shaft by correlating a fluid-actuated transmission and a direct drive transmission of force applied to a drive shaft.

Another object of this invention is to selectively control the power transfer of the fluid-actuated portion of the device by manual and/or speed-responsive means.

Another object of this invention is to apply torque to a drive shaft, transmit the same selectively to a counter shaft and a driven shaft, the torque applied to the driven shaft varying from a value of zero to maximum in accordance with the amount of torque utilized by the counter shaft.

Another object of this invention is to supply a first and second pump having the inlet of one connected with the outlet of another and the outlet of the said second pump being connected to the inlet of the first pump, thereby forming a sealed or closed fluid flow system within the pumps.

Yet another object of this invention is to vary the output of the second pump in accordance with the amount of torque desired to be applied to the driven shaft.

A still further object of this invention is to supply a pair of pumping units connected together inlet to outlet, and outlet to inlet, with means for varying the ratio by varying the volume of output per revolution of the pumps inversely.

Another object of this invention is to utilize a speed-responsive governor for controlling an auxiliary pump, the speed-responsive governor being actuated by the power input shaft and also actuating the auxiliary pump by means of the same shaft, whereby through intermediate means the auxiliary pump and speed-responsive governor operate on a valve for controlling the flow of fluid from the auxiliary pump to vary the composite output torque of the two pumps which form the sealed hydraulic system.

A still further object of this invention is to provide an extremely simplified mechanical device for performing the above mentioned functions as well as numerous ancillary functions.

Other objects and features of novelty will become apparent to those skilled in the art, in following the description of the preferred form of the invention, illustrated in the accompanying drawings, wherein:

Figure 2 is a plan view of the invention shown in Figure 1;

Figure 3 is a sectional view showing the juxtaposed pumps forming a major portion of the invention and the control means therefor;

Figure 5 is a transverse sectional view of the invention shown in Figure 1;

Figure 6 is a perspective view of one of the plates forming a portion of the invention;

Figure 7 is a side view of a support for the ratio varying angular plates;

Figure 8 is a perspective view of one of the pistons in the juxtaposed pumps;

Figure 11 is a sectional view taken substantially on the line 11—11 of Figure 1 and in the direction of the arrows;

Figure 12 is an elevational end view of one of the pump elements;

Figure 13 is a sectional view taken on the line 13—13 of Figure 12 and in the direction of the arrows;

Figure 14 is an elevational view of another pump component;

Figure 15 is a sectional view taken substantially on the line 15—15 of Figure 14 and in the direction of the arrows;

Figure 16 is a sectional view taken substantially on the line 16—16 of Figure 1 and in the direction of the arrows; and Figure 17 is a sectional view taken substantially on the line 17—17 of Figure 16 and in the direction of the arrows.

Figure 1:
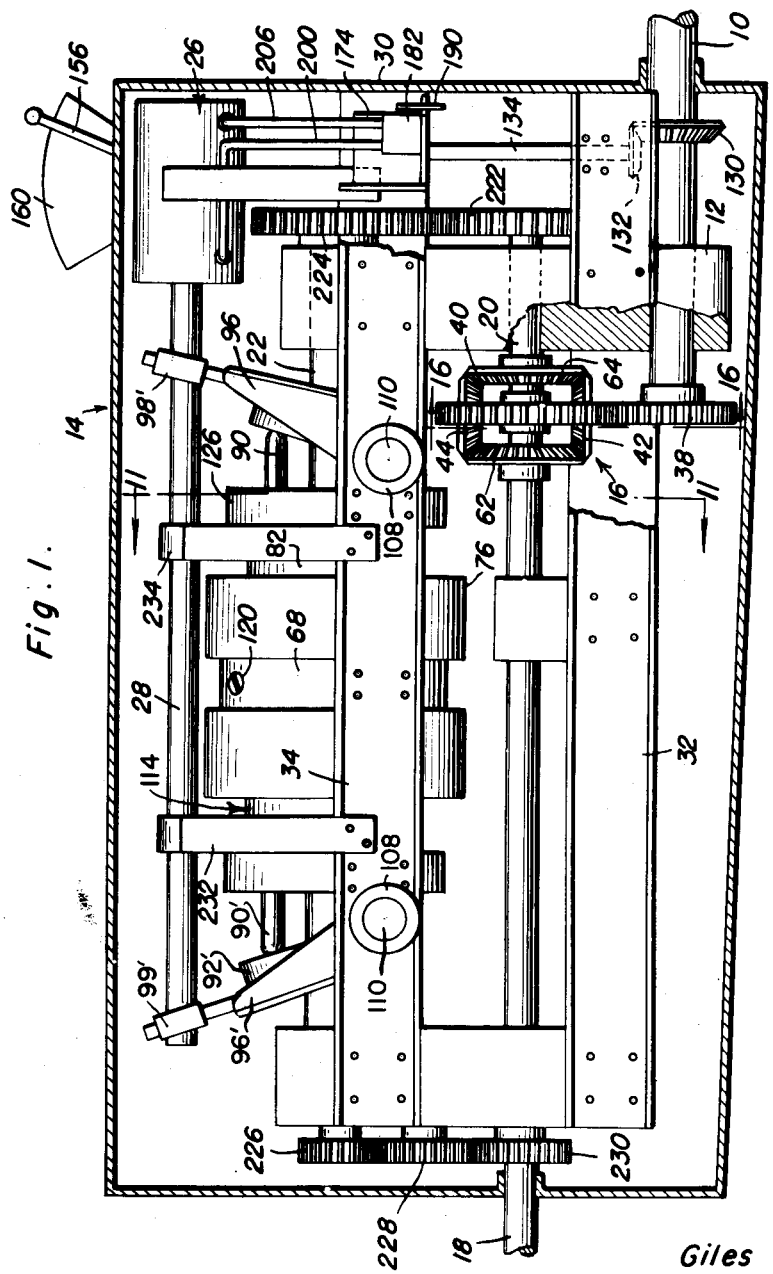
Figure 1 is a longitudinal sectional view of the preferred form of the invention.

This invention has been developed to provide a device for more efficiently and smoothly transmitting a mechanical movement. For the best understanding of the invention, it is deemed advisable to first set forth the operation thereof, which is as follows:

Operation

A complete cycle of operation, from a neutral to top speed and back to the neutral position includes the application of a torque to the power or drive shaft 10 which is journaled in a bearing 12, which is in turn associated with a frame or support generally indicated at 14. Under such conditions, the shaft 10 rotates and applies the same torque to a differential generally indicated at 16. Assuming the power take-off or driven shaft 18 to be stopped, the torque is transmitted wholly to the counter shaft 20. This counter shaft, of course, is thereby rotated, thereby, in turn, rotating a pump shaft 22.

A speed-responsive and/or manually operative control system (see Fig. 4) is also actuated by the counter shaft 20 through the medium of intermediate gearing. The servomotor generally indicated at 26 is influenced upon predetermined conditions which will be described subsequently. However, it is noted that this servomotor actuates a rod 28.

When the drive shaft 10 rotates at a selected R. P. M., the driven shaft 18 will not be influenced when a pair of pumps (see Fig. 3) are in the neutral position. It will be noted that two pump assemblies are seen in Figure 3 having the inlet of one connected to the outlet of the other, and the outlet of the other connected to the inlet of the said one. By this means, a closed fluid system is supplied. It is seen that each pump must operate with an equal capacity, although the volume of each pump unit is readily adjustable by the control system seen in Figure 4. Thus, by manipulation of the rod 28, it is possible to obtain a setting of the two pumps (first and second) so that no fluid is pumped when it is revolved. Thus, if no fluid is pumped, the second pump cannot be revolved: thereby, through the medium of gearing, one of the gears of the differential 16 is locked and the torque applied to the drive shaft 10 is transferred to harmless rotation of the pump elements.

When increased torque or greater R. P. M. is applied to the shaft 10, the speed-responsive governor will move the hydraulic valve seen clearly in Figure 4, so that the fluid produced by the auxiliary gear pump also seen in this figure will flow to a servomotor and exert a force to move the rod 28 and thus change the front pump's angle plate and cause that front pump to produce movement of the fluid in the said sealed system.

The rear pump begins to revolve as soon as the first pump has a place to pump its fluid and thus the action of the front pump, pumping fluid to the inlet of the rear pump, and the rear pump pumping fluid to the inlet of the front pump is set up. Simultaneously, the gear which was previously described as locked in the differential begins to revolve, thereby driving the rear pump and the driven mechanism including the driven shaft 18.

Therefore, it can be seen that the power is transmitted through both direct gearing and the hydraulic transmitting mechanism. This double action occurs at all ratios of speed input to one of the double pumps to speed output of the other double pump, except at maximum R. P. M. and during a speed which might be considered neutral (wherein there is no rotation of the shaft 18). Also, this occurs when all power is transmitted by the differential directly to the shaft 18 or when no power whatsoever is transmitted to the shaft 18.

The variance in ratio is controlled by the hydraulic transmitting mechanism, with the control system automatically selecting the proper ratio for that hydraulic transmitting mechanism to set up between the engine (drive shaft 10) and driven shaft 18. This ratio is varied and/or maintained by varying the proportion of the fluid pumped per revolution by one pump in relation to the fluid pumped per revolution of the second pump. As the capacity of the pumps must remain equal, this means that if the rear pump produces, for example, one cubic inch of fluid every revolution, it must revolve ten times as the front pump produces ten cubic inches of fluid per revolution. Thus, there is a ratio of ten to one. The control system may vary this ratio change an extremely small amount or completely, such ratio change being carried through the differential and to the driven member 18.

The ratio is changed by the control system, which, to increase the load on the shaft 10 and thus slow the shaft 10, decreases the mechanical advantage of the engine or the like which is driving the shaft 10 (over the driven member 18) by increasing the amount of fluid pumped by the first pump and decreasing the amount of fluid pumped by the second pump. Upon acceleration, the ratio is gradually changed to meet the changing ratio requirements, with the fluid pumped by the first pump per unit revolution increasing and the fluid pumped by the pump of the rear unit decreasing as higher speed is attained.

At top speed, the transmission reverts to the opposite of the neutral position. That is, the amount of fluid pumped by the rear unit has been decreased until no pumping action occurs. This locks the front pump and consequently the forward gear of the differential 16. All power is then transmitted from the drive shaft 10 through the medium of a partially locked differential to the driven shaft 18. Further acceleration of the shaft 10 will be transmitted directly to the shaft 18 as the hydraulic portion of the device is inoperative. If additional load is imposed upon the shaft 18 at any time to slow the shaft 10 below the selected R. P. M., then the governor will move the control valve in such a way as to influence the control system to increase the output of the rear pump and decrease the output of the front pump. Thus, the additional mechanical advantage mentioned above is utilized for actuation of the driven shaft 18 which will incidentally save wear on the prime mover which is actuating the shaft 10. The lightening of the load of the engine is reponsible for such a saving.

When the shaft 10 is reduced insofar as speed is concerned, the control system will attempt to decrease the mechanical advantage of the driven member 18 to allow the engine or other prime mover which is associated with the shaft 10 to turn at the incident R. P. M. This action decreases the advantage of the driven member sufficiently to allow that member to force the engine or other prime mover to revolve at the selected R. P. M. as long as the driven member continues to be motivated.

When the driven member comes to a stop, the control system will have moved the angle plate of the rear pump to its greatest angle, and the angle plate associated with the other pump to its smallest angle. Thus, the transmission is again in neutral and the driven member is locked with the power input shaft 10 free to rotate.

In performance of the above described operation, the structure necessary and desired incorporates many various conventional elements which are connected together in the following manner.

*Frame construction*

The said frame generally indicated at 14 is supplied mostly for convenience and may include various elements. Among these elements is a housing 30 which may partially or entirely encompass the operating elements of the invention. The said shaft 10 is supplied in a suitable aperture adjacent the lower portion of the housing 30 and is journaled in a bearing 12, as described above. This bearing is connected with substantially parallel support members 32 and 34, respectively, which form the actual foundation or support.

This foundation or support is substantially rectangular in configuration and has tie members 36 extending thereacross for additional rigidity. The specific structure of the frame 14 is not of major importance, the frame construction being made to accomodate the various elements of the device in order that it may operate in the desired manner.

*Differential system*

The said power input or drive shaft 10 is supplied with a gear 38 at one end thereof (see Figs. 16 and 17), which is enmeshed with a gear 40. This gear 40 forms a portion of a differential and journals a pair of spider gears 42 and 44, respectively, in suitable apertures therein. The said spider gears 42 and 44 may be supplied with conventional pins or stub shafts 46 and 48, respectively, which are journaled in bearings 50 and 52, as is seen in Figure 17. The opposite ends of the said pins 46 and 48 are journaled in a central body member 54 which, in turn, has opposed shafts 56 and 58, respectively, associated therewith. These opposed shafts are aligned and are received in recesses ends of the counter shaft 20 and the driven shaft 18.

An anti-friction bearing construction, preferably of the roller type, may be supplied adjacent the terminal of the said aligned shafts 56 and 58 and may be seen at 60. It will be noted at this point that any type of anti-friction bearing may be supplied if it is found desirable, and for simplicity and economy of structure, simple babbitt type bearings may be used.

Supplied on the terminals of the said shafts 18 and 20 is a pair of identical gears 62 and 64, respectively, which are constantly enmeshed with the said spider gears 42 and 44. As described previously in the specification, the maintaining of the power take-off shaft 18 in a locked position will permit rotation of the gear 64 and consequently the counter shaft 20 upon application of a torque to the shaft 10. However, the force taking the line of least resistance will apply the torque to the shaft 18 in the event that it is more difficult to rotate the counter shaft 20.

*Hydraulic transmission system*

Attention is now directed primarily to Figures 3-10 wherein a pumping system is disclosed. In Figure 3, a central pump block 68 is illustrated and this block includes a pair of chambers 70 and 72 respectively which are separated by means of a partition 74. The block 68 is externally threaded in order to accommodate opposed identical housings 76 and 78 respectively. Further, a plate 80 may be attached to the said block 68 in order to support the block on the frame construction by any suitable means such as bolting, riveting, welding or the like.

Upon further consideration of Figure 3, it will be seen that the pumping mechanism is symmetrical, there being identical structure on each side of a transverse center line. Noting first the pump, which might be considered the first pump, it is quite apparent that a cylinder block 82 is supplied with a flange 84 about the periphery of one end thereof. This flange engages a plurality of bearings, preferably of the ball type 86, which are interposed between the said flange 84 and the cage 76. By this expedient, the cylinder block 82 is bodily rotatable on the center block 68.

A plurality of pistons 88 having piston rods 90 rigidly secured thereto are reciprocably mounted in the cylinders of the said cylinder block.

Means for varying the stroke of the pistons 88 is provided, and includes for the first pump an angle plate 92 having a plurality of radial grooves 94 therein. The ends of the piston rods 90 are engaged in the grooves 94 whereby, upon rotation of the cylinder block 82 with the angle plate 92 in a selected position, the stroke of the piston rods, and therefore the pistons, is regulated and directed in a prescribed course due to the radial slots 94.

The plate 94 is attached to a backing member and forms a part of the angle plate assembly. The backing member or angle plate assembly part 96 is pivoted at two places. The backing plate includes an extension 97 and an extension 97'. The extensions are slidable in bearings 98 and 98'. The bearings are secured to the rod by means of a pivot pin 100, allowing swinging or pivotal movement of the bearings about the pivot pin 100 as an axis. The extensions are slidable through the bearings 98 and 98'. By this construction, the angle plate assembly is pivotally operable about its lower pin 110 as an axis in response to movement of the rod 28.

A central aperture is supplied in the backing plate 96 and is indicated at 102. This aperture has a continuation in the angle plate 92 as seen at 104. Through this medium of the apertures, the shaft 22 is permitted to extend through the angle plate. The shaft is splined in a central aperture provided in the bearing block 82. In order to pivot the backing plate 96, as previously described, the pin 110 which is fixed to the plate 96 is used, inasmuch as it is operable in the bearings 108, supplied in the frame.

A second pump, generally indicated at 114, is of identical construction with respect to the first pump. This second pump includes pistons 88' having piston rods 90' engageable in radial slots provided in the angle plate 92'. The backing plate 96' which is identical to the backing plate 96 is supplied in association with the angle plate.

The backing plate 96' has extensions which are operable in bearings 99 and 99'. These bearings are fixed by means of the pivot 100' to the rod 28 in a manner identical to the attachment of the bearings 98 and 98'. They also serve an identical function.

It is readily appreciated from an inspection of Figure 3 that upon manipulation of the rod 28, the stroke of the pistons 88' is regulated as is the stroke of the pistons 88. Moreover, since there is a sealed or closed hydraulic system connecting these pumps, the input of one pump necessarily reflects on the output of the other pump, hence the output torque of the shaft 112. When the angle plates are in a selected position, the second pump 114 transmits no torque, as the throw of the pistons of the first pump counterbalance the throw of the pistons of the second pump, thereby rendering torque output a nullity.

In order to fill the chambers 72 and 70, respectively, a pair of filler plugs 118 and 120 are supplied in apertures 122 and 124 and are held in place by any suitable means as screw threads. In order to provide ends for the cylinders within the cylinder blocks of each pump, plates 126 are supplied in each cylinder block with appropriate openings 128 therein in order to accommodate the piston rods 90 and form a passage therefor. Moreover, these plates 126 have keyways 130 in order to seat the pins which are either formed integral with the cylinder blocks or detachable in nature.

Control system

Figure 4:
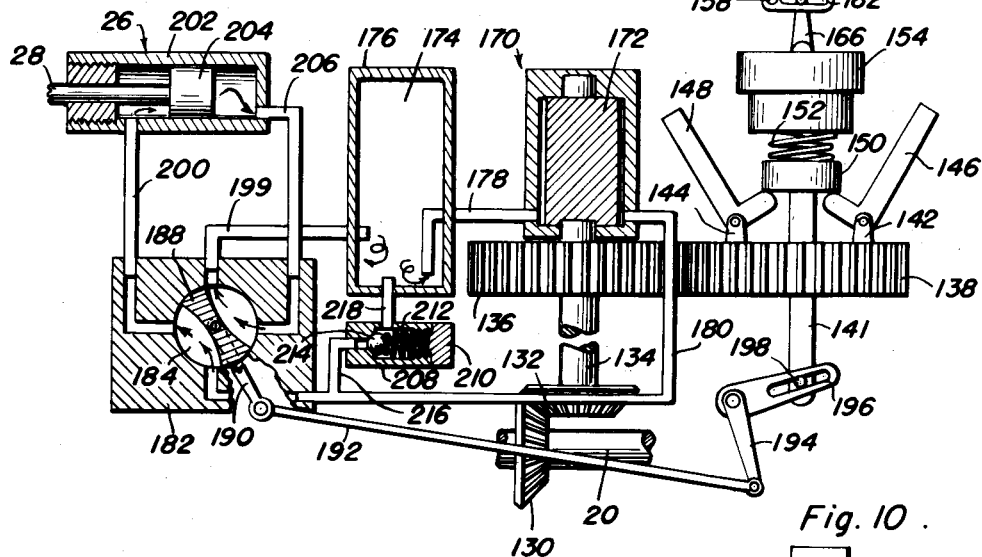
Figure 4 is a schematic view showing the auxiliary pump and associated mechanism for controlling the torque output of the two juxtaposed pumps.
Figure 9:
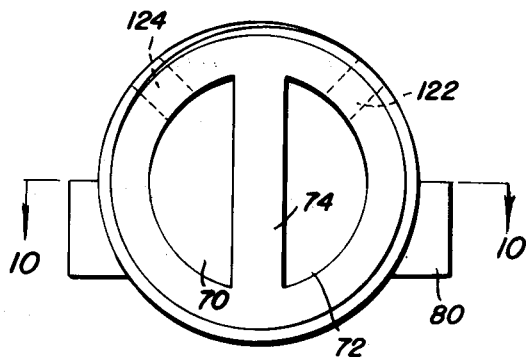
Figure 9 is an elevational view of a bearing block forming a portion of each of the pumps and connecting the same.
Figure 10:
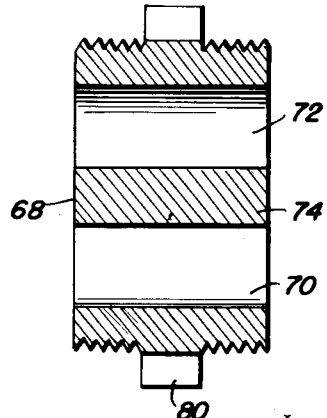
Figure 10 is a sectional detail of construction taken on line 10—10 of Figure 9 and in the direction of the arrows.

For the control system, attention is directed primarily to Figure 4, wherein there is disclosed an arrangement of elements forming the major portion of the control system of the present invention. The counter shaft 20 has a bevel gear 130 rigidly attached thereto which is enmeshed with a complemental bevel gear 132. This last-mentioned bevel gear 132 is attached to a shaft 134 which, in turn, has a large gear 136 rigidly secured thereto. This large gear 136 is meshed with another gear 138 having a shaft 140 extending therefrom. It is now seen that upon rotation of the counter shaft 20, the gear 136 and the gear 138 will be rotated. Brackets 142 and 144, respectively, are attached to the said gear 138 and are rotatable therewith. Weighted members 146 and 148, respectively, are pivoted to the said brackets 142 and 144 and are so arranged as to be speed-responsive. Upon a relatively large speed, the weighted members tend to spread due to centrifugal force and thereby lift the shaft 141 which slides through the center of the gear 138. In accordance with a predetermined speed, the shaft 141 having a disk 150 at the top thereof is raised. Upon this raising, the spring 152 seated on the disk 150 is compressed against a stationary block or element 154. It is now seen that the raising or lifting of the shaft 141 is in response to the difference between the compressive force of the spring 150 and the centrifugal force motivating the weighted members 146 and 148.

In order to effect substantially the same result, that is, to raise and lower the element 141, a crank 156 is supplied on a pivot pin 158, which is anchored to the frame 14. An indicia bearing plate 160 may be supplied adjacent the crank 156 and a slot 162 is formed in one end of the crank 156. This slot has a pin 164 which rides therein, which pin in turn is attached to a suitable bracket 166. Of course, the said bracket 166 is associated with the movable portion of the block 154 in order to urge the same for transmission of force against the spring 152.

An auxiliary pump generally indicated at 170 is supplied and the rotor 172 of the said pump is rigidly secured to the said shaft 134. It may now be seen that upon rotation of the shaft 134 not only does the gear 136 rotatable but also the rotor 172 is actuated.

A plenum chamber 174 is supplied in a suitable housing 176 and has a quantity of fluid stored therein. This quantity of fluid is permitted to circulate through the auxiliary pump 170 through the medium of a conduit 178. This conduit being received in the pump housing and the plenum chamber 174 receives the pumped fluid and conducts the same through a second conduit 180. This second conduit terminates in a valve body 182 and more specifically, in the valve chamber 184 thereof. A valve core 188 is rotatively received in the valve chamber 184 and is actuated by means of an arm 190 which is secured thereto. This arm 190 has a pitman 192 attached thereto in the usual manner for pitman rods and the opposite end of the said pitman is secured to a bellcrank 194. One arm of the bellcrank 194 has a slot 196 therein and a pin 198 rides freely in this slot. This last-mentioned pin 198 is an integral part or is secured rigidly to the said shaft 141. The operation thus far described indicates a mechanism whereby, upon either manual or speed-responsive control, a valve may be regulated.

Communicated with the valve chamber 184 is a pipe 199 which terminates in the plenum chamber 174 for re-circulation of fluid. Also communicated with the valve chamber is another conduit 200 terminating in the servomotor 26.

The preferable structure of the servomotor may be either diaphragm or piston type. For illustrative purposes, a cylinder housing 202 is supplied with a piston 204 therein. The said rod 28 is secured to the piston 202 and is actuatable therewith. The said conduit or pipe 200 terminates on one face of the piston while another conduit terminates in the valve chamber 84 and in the cylinder member 202, at the opposite face of the piston 204. On manipulation of the valve, it is readily apreciated that fluid may be supplied on either face of the piston head 204 in order to actuate the rod 28 in either of two directions.

Pressure responsive means is supplied in association with this system in order to re-circulate a certain portion of the fluid. This pressure-responsive means may be seen as obviously the cage 208 which has an adjustable and detachable plug 210 threadedly received in one end thereof. A spring 212 or other suitable resilient biasing means is seated on the said plug 210 and reacts on a ball 214 or other suitable type of check valve. Communicated with the bore of the cage 208 is a small length of pipe 216 which intersects the conduit 180. Another small length of conduit 218 communicates the bore of the cage 208 with the plenum chamber 174.

Through the above described structure, the value of angularity of the angle plates 92 which are interposed on the supports 94 through the medium of the ball bearings 220 is effected.

In order to transmit torque from the counter shaft 20 to the pump shaft 22, the preferred means is the utility of a plurality of gears. For this structure, attention is directed primarily to Figure 1 wherein the gear 222 is shown as rigidly secured to one end of the counter shaft 20 and this last-mentioned gear is enmeshed with a complemental gear 224 which is attached to the said shaft 22.

At the opposite end of the fluid transmission portion of the device, it is readily appreciated that the shaft 112 terminates in a gear 226. In order to add the torque of the shaft 212 to the torque of the shaft 18 in the proper directions in order that they will not be opposing each other, an idler gear 228 is journaled on the frame 14 and this idler gear 228 engages another gear 230. Of course, the last-mentioned gear 230 is rigidly attached to the shaft 18, thereby rounding out the necessary structural elements appurtenant to the present invention.

It is apparent that many variations may be made without departing from the spirit of the invention such as the utility of a cover 230 for the said weighted members 146 and 148, and suitable bearing members 232 and 234 respectively in order to support the rod 28. These expedients and others may of course be resorted to without departing from the spirit of the invention. Accordingly, limitation is sought only in accordance with the scope of the following claims.

Having described the invention, what is claimed as new is:

1. In a transmission including a frame, a power input shaft journaled in said frame, a counter shaft and a differential interposed between said power input shaft and said counter shaft, a first pump having an inlet and an outlet, a second pump having an inlet and an outlet, each pump being carried by said frame and said first pump being connected with its inlet to the outlet of the second pump forming a closed fluid flow system, said pumps including pistons which have piston rods, tiltable plates engaging the piston rods, said first pump having a shaft and said second pump having a shaft, means for controlling the angularity of said plates to regulate the speed of the shaft of the second pump relative to the speed of the shaft of the first pump, a driven shaft operatively connected with said differential and the shaft of said second pump, means drivingly connecting the shaft of said first pump and said counter shaft, said plate controlling means including an auxiliary pump driven by said power input shaft, a speed-responsive governor driven by said power input shaft, a valve actuated by said governor, said valve being communicated with said auxiliary pump, a rod secured to said plates, and means secured to said rod and connected with said valve for motivating said rod.

2. The combination of claim 1 and said last-mentioned means including a servomotor.

3. A transmission comprising a frame having a drive shaft and a driven shaft, a counter shaft and a differential connecting said drive shaft, driven and counter shafts, a first pump having a shaft and an inlet and an outlet, a second pump having a shaft and an inlet and an outlet, both pumps carried by said frame, the inlet of the first pump being connected to the outlet of the second pump, and the outlet of the first pump being connected to the inlet of the second pump to form a sealed fluid system, means for selectively varying the amount of fluid pumped by the second pump with respect to the first pump during a single revolution of the pumps, means for drivingly connecting said counter shaft and the shaft of said second pump, means for drivingly connecting the shaft of said first pump and said drive shaft, said pumps having pistons with piston rods, said means for varying the amount of fluid pumped including a pair of pivoted plates engaging the piston rods, and a rod connecting said plates together with means for actuating said rod whereby said plates are operated simultaneously, said rod actuation means comprising an auxiliary pump, a plenum chamber connected with the auxiliary pump, a valve controlling the flow of fluid from said plenum chamber, a servomotor actuating said rod, and conduits connecting said valve and said servomotor.

4. A transmission comprising a frame having a drive shaft and a driven shaft, a counter shaft and a differential connecting said drive shaft, driven and counter shafts, a first pump having a shaft and an inlet and an outlet, a second pump having a shaft and an inlet and an outlet, both pumps being carried by said frame, the inlet of the first pump being connected to the outlet of the second pump, and the outlet of the first pump being connected to the inlet of the second pump to form a sealed fluid system, means for selectively varying the amount of fluid pumped by the second pump with respect to the first pump during a single revolution of the pumps, means for drivingly connecting said counter shaft and the shaft of said second pump, means for drivingly connecting the shaft of said first pump and said drive shaft, said pumps having pistons with piston rods, said means for varying the amount of fluid pumped including a pair of pivoted plates engaging the piston rods, a rod connecting said plates, means connected to said rod for actuating said rod whereby said plates are pivotally operated simultaneously, said rod actuation means comprising an auxiliary pump, a plenum chamber connected with the auxiliary pump, a valve controlling the flow of fluid from said plenum chamber, a servomotor actuating said rod, conduits connecting said valve and said servomotor, and a pressure-responsive check valve operatively connected with said valve and said plenum chamber.

5. The combination of claim 4 and a speed-responsive device driven by said drive shaft and operatively connected with said first-mentioned valve to regulate said first-mentioned valve.

GILES P. LAY.

REFERENCES CITED

The following references are of record in the file of this patent:

UNITED STATES PATENTS

| Number | Name | Date |
| --- | --- | --- |
| 1,077,454 | Cooke | Nov. 4, 1913 |
| 1,924,017 | Bedford | Aug. 22, 1933 |
| 2,485,126 | Wood | Oct. 18, 1949 |

FOREIGN PATENTS

| Number | Country | Date |
| --- | --- | --- |
| 218,889 | Great Britain | July 17, 1924 |